US009922018B2

(12) United States Patent
Chan et al.

(10) Patent No.: US 9,922,018 B2
(45) Date of Patent: Mar. 20, 2018

(54) SCROLLBAR FOR ZOOMING ON ROWS AND COLUMNS OF A SPREADSHEET AND INTERPRETING CELLS

(71) Applicant: Microsoft Corporation, Redmond, WA (US)

(72) Inventors: Wai Chan, Bellevue, WA (US); Salvador Celis, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 800 days.

(21) Appl. No.: 13/674,349

(22) Filed: Nov. 12, 2012

(65) Prior Publication Data

US 2014/0136939 A1 May 15, 2014

(51) Int. Cl.
| | | |
|---|---|---|
| *G06F 17/24* | (2006.01) | |
| *G06F 3/048* | (2013.01) | |
| *G06F 17/21* | (2006.01) | |
| *G06F 3/0485* | (2013.01) | |

(52) U.S. Cl.
CPC ............ *G06F 17/246* (2013.01); *G06F 3/048* (2013.01); *G06F 3/04855* (2013.01); *G06F 17/211* (2013.01)

(58) Field of Classification Search
CPC .... G06F 17/211; G06F 17/245; G06F 17/246; G06F 3/04855; G06F 3/0485
USPC ............................. 715/227, 784–787; 725/52
See application file for complete search history.

(56) References Cited

U.S. PATENT DOCUMENTS

| | | | |
|---|---|---|---|
| 4,709,348 A | 11/1987 | Horn et al. | |
| 5,708,827 A * | 1/1998 | Kaneko | G06F 17/246 715/219 |
| 5,880,742 A | 3/1999 | Rao et al. | |
| 6,771,279 B2 | 8/2004 | Syukri | |
| 7,010,751 B2 | 3/2006 | Shneiderman | |
| 7,228,492 B1 * | 6/2007 | Graham | G06F 17/30867 345/440 |
| 7,434,177 B1 * | 10/2008 | Ording et al. | 715/862 |
| 7,689,583 B2 | 3/2010 | Bozich et al. | |
| 7,853,868 B2 * | 12/2010 | Weber | G06F 17/246 715/212 |

(Continued)

OTHER PUBLICATIONS

Compiz Wiki, Internet publication Apr. 30, 2009 all the pages. http://wiki.compiz.org/Plugins/Mag.*

(Continued)

*Primary Examiner* — Cesar Paula
*Assistant Examiner* — Benjamin Norris
(74) *Attorney, Agent, or Firm* — Jared S. Goff; Goff IP Law PLLC

(57) ABSTRACT

A user interface control is presented for assisting the computer user in viewing cells with a data table. In particular, a vector viewing control is presented which enables the computer user to view cells within a data table. The vector viewing control comprises a plurality of cell elements, each cell element corresponding to one or more cells in the data table. The cell elements correspond to a vector of cells in the data table that is represented by the vector viewing control. Upon user interaction with the vector viewing control, an expanded view is presented showing the contents of the data cell corresponding to the location of the interaction point on the control. The computer user can move the expanded view up and down the vector to view the contents of the data table.

20 Claims, 12 Drawing Sheets

(56) References Cited

U.S. PATENT DOCUMENTS

| | | | |
|---|---|---|---|
| 7,895,209 | B2 | 2/2011 | Spence et al. |
| 7,937,663 | B2 | 5/2011 | Parker et al. |
| 8,276,176 | B2* | 9/2012 | Ahmad-Taylor ............... 725/52 |
| 2002/0069221 | A1 | 6/2002 | Rao et al. |
| 2008/0034381 | A1* | 2/2008 | Jalon ................ G06F 17/30126 719/329 |
| 2008/0065580 | A1 | 3/2008 | Spence et al. |

OTHER PUBLICATIONS

Microsoft Word screen dumps, Copyright 2010, pp. 1-2.*
ZHacks.com, Magnifier Helps Reading by Enlarging Screen in Windows 7, pp. 1-2, http://www.zhacks.com/magnifier-helps-reading-by-enlarging-screen-in-windows-7/, Apr. 13, 2010.*
Deb Westfahl NPL youtube video, Sep. 1, 2011, https://www.youtube.com/watch?v=c-rYoZokfYU.*
DPChallenge, NPL Captured Jan. 15, pp. 1-2 2004https://web.archive.org/web/20040115194917/http://www.dpchallenge.com/tutorial.php?TUTORIAL_ID=17.*
Masui, Toshiyuki, "LensBar—Visualization for Browsing and Filtering Large Lists of Data", Retrieved at <<http://ieeexplore.ieee.org/stamp/stamp.jsp?tp=&arnumber=729567>>, In Proceedings of IEEE Symposium on Information Visualization, 1998, Oct. 19, 2007, pp. 7.
Golmie, et al., "Highlight and Selection Control for Dynamic Table Visualization", Retrieved at <<http://prism.cs.umd.edu/hcil/academics/courses/fall1999/cmsc838s/Project/wmk/paper.pdf>>, Retrieved Date: Sep. 4, 2012, pp. 8.
McCrickard, et al., "Beyond the Scrollbar—An Evolution and Evaluation of Alternative Navigation Techniques", Retrieved at <<http://ieeexplore.ieee.org/stamp/stamp.jsp?tp=&arnumber=4305571>>, In Proceedings of IEEE Symposium on Visual Languages, Sep. 13, 1999, pp. 8.

* cited by examiner

| | | | | | | |
|---|---|---|---|---|---|---|
| P006956 | WIDER CR | LCR | GR | Caribbean | 6/30/1944 | 1994 |
| P006364 | BR:INNOV | LCR | BR | Brazil | 6/26/1991 | 1991 |
| P003928 | AGRICULT | EAP | ED | Indonesia | 9/5/1991 | 1992 |
| P001802 | HEALTH | EAP | CN | China | 6/19/1986 | 1986 |
| P001776 | MAP TO | AFR | MZ | Mozambiq | 1/15/1993 | 1993 |
| P001765 | EDUCATI | AFR | MZ | Mozambiq | 12/20/1990 | 1990 |
| P000901 | AGRLRE | AFR | MZ | Ghana | 6/14/1985 | 1985 |
| P000821 | WATER S | AFR | GH | Gambia | 5/24/1990 | 1990 |
| P000226 | PRIV SEC | AFR | GM | Burundi | 4/30/1992 | 1992 |
| P044389 | EMG RECC | ECA | BI | Bosnia | 3/1/1996 | 1996 |
| P034622 | ODS PHAS | ECA | BA | Hungary | 11/5/1995 | 1995 |
| P010386 | POWER DI | SAR | HJ | Sri Lanka | 9/10/1991 | 1991 |
| P009030 | HEALTH | ECA | LK | Turkey | 5/11/1989 | 1989 |
| P008869 | IN SITU | ECA | TR | Turkey | 3/11/1993 | 1993 |
| P008511 | URBAN TR | ECA | KZ | Kazakhsta | 4/7/1994 | 1994 |

| | | | | | | |
|---|---|---|---|---|---|---|
| P006956 | WIDER CR | LCR | GR | Caribbean | 6/30/1944 | 1994 |
| P006364 | BR:INNOV | LCR | BR | Brazil | 6/26/1991 | 1991 |
| P003928 | AGRICULT | EAP | ED | Indonesia | 9/5/1991 | 1992 |
| P001802 | HEALTH | EAP | CN | China | 6/19/1986 | 1986 |
| P001776 | MAP TO | AFR | MZ | Mozambiq | 1/15/1993 | 1993 |
| P001765 | EDUCATI | AFR | MZ | Mozambiq | 12/20/1990 | 1990 |
| P000901 | AGRLRE | AFR | MZ | Ghana | 6/14/1985 | 1985 |
| P000821 | WATER S | AFR | GH | Gambia | 5/24/1990 | 1990 |
| P000226 | PRIV SEC | AFR | GM | Burundi | 4/30/1992 | 1992 |
| P044389 | EMG RECC | ECA | BI | Bosnia | 3/1/1996 | 1996 |
| P034622 | ODS PHAS | ECA | BA | Hungary | 11/5/1995 | 1995 |
| P010386 | POWER DI | SAR | HJ | Sri Lanka | 9/10/1991 | 1991 |
| P009030 | HEALTH | ECA | LK | Turkey | 5/11/1989 | 1989 |
| P008869 | IN SITU | ECA | TR | Turkey | 3/11/1993 | 1993 |
| P008511 | URBAN TR | ECA | KZ | Kazakhsta | 4/7/1994 | 1994 |

| VAR | $/per | METAL | STONE | SALE % | IMAGE | CLN |
|---|---|---|---|---|---|---|
| RING-Y22 | 375.00 | W GOLD | RUBY | 20% | Y22.jpg | Estate |
| RING-A39 | 675.00 | Y GOLD | SAPH | 10% | A39.jpg | VintQ |
| RING-Y41 | 849.00 | W GOLD | EMER | 20% | Y41.jpg | Modern |
| RING-005 | 142.00 | S SILVER | TOPAZ | 40% | 005.jpg | SoWest |
| RING-X10 | 4,987.00 | PLAT | DIAM | NONE | X10.jpg | Estate |
| RING-002 | 79.00 | S SILVER | TURQ | 40% | 002.jpg | SoWest |
| RING-RR3 | 390.00 | ROS GOLD | NONE | 25% | RR3.jpg | Jazzi |
| RING-A57 | 498.00 | Y GOLD | DIAM | 10% | A57.jpg | VintQ |
| RING-Y19 | 750.00 | W GOLD | PEARL | 20% | Y19.jpg | Modern |
| RING-009 | 127.00 | S SILVER | CITRINE | 40% | 009.jpg | SoWest |
| RING-Y64 | 466.00 | W GOLD | RUBY | 20% | Y64.jpg | Modern |
| RING-Y72 | 650.00 | W GOLD | AQUA | 20% | Y72.jpg | VintQ |
| RING-004 | 155.00 | S SILVER | PERIDOT | 40% | 004.jpg | SoWest |
| RING-X23 | 2,500.00 | PLAT | DIAM | NONE | X23.jpg | Estate |
| RING-A88 | 589.17 | Y GOLD | SAPH | 10% | A88.jpg | Jazzi |
| RING-Y89 | 427.00 | W GOLD | OPAL | 20% | Y89.jpg | Estate |
| RING-A23 | 476.00 | Y GOLD | SAPH | 10% | A23.jpg | VintQ |
| RING-Y48 | 720.00 | W GOLD | AMETH | 20% | Y48.jpg | Modern |
| RING-007 | 105.00 | S SILVER | CORAL | 40% | 007.jpg | SoWest |
| RING-X51 | 3,650.00 | PLAT | DIAM | NONE | X51.jpg | Estate |
| RING-003 | 85.00 | S SILVER | TURQ | 40% | 003.jpg | SoWest |

*FIG. 4B*

SCROLLBAR FOR ZOOMING ON ROWS AND COLUMNS OF A SPREADSHEET AND INTERPRETING CELLS

BACKGROUND

When a person is looking at large table of data on a computer, it is often very difficult for the person to easily find or preview a particular cell within the table. This can occur because there is too much data to quickly scan, or because the data is formatted in a way that it is hard to visually consume. The problem is even greater when the data is rendered by a program or application on the computer by way of a limited viewport and/or the data is paginated in multiple sections such that the user must to scroll through several "pages" of data before getting to a particular cell.

Many applications offer a "search/find" feature that permits a person (a computer user) to search for specific data within a table. However, even when the computer user is able to specify the exact content by way of a search/find function, there may be several instances in the data table that satisfy the search query. Further still, even when the computer user is able to specify the exact content in a table, if the presentation of the table is poor or the content is dense, it is still often difficult to visually locate the content.

SUMMARY

A user interface control is presented for assisting the computer user in viewing cells with a data table. In particular, a vector viewing control is presented which enables the computer user to view cells within a data table. The vector viewing control comprises a plurality of cell elements, each cell element corresponding to one or more cells in the data table. The cell elements correspond to a vector of cells in the data table that is represented by the vector viewing control. Upon user interaction with the vector viewing control, an expanded view is presented showing the contents of the data cell corresponding to the location of the interaction point on the control. The computer user can move the expanded view up and down the vector to view the contents of the data table.

According to aspects of the disclosed subject matter, a method and computer readable media having computer executable instructions are presented for facilitating access to data in a data table. A vector viewer control is presented in conjunction with the presentation of a viewport in an application window that displays a data table on an output device. The vector viewer control comprises a plurality of cell elements, each cell element corresponds to one or more cells in the data table. Further, the plurality of cell elements corresponds to a vector of cells in the data table that is represented by the vector viewing control. A notice of computer user interaction with vector viewer control is received. The computer user interaction comprises an interaction point on a cell element of the vector viewer control. An expanded view of the vector viewing control proximate to the interaction point is presented. The expanded view includes the content of a cell of the data table.

According to further aspects of the disclosed subject matter, a computer system configured to provide facilitated access to data in a data table is presented. The computer system comprises a processor and a memory, where the processor executes instructions stored in the memory as part of or in conjunction with additional components for presenting the data table for display to a computer user. Additional components include a display subsystem and a data storage subsystem. The display subsystem presents content to for viewing by a computer user, the content being rendered by one or more applications executing on the computer system. The data storage subsystem hosts a plurality of executable applications, including an application configure to present an application window on the display device. The data storage subsystem also hosts an executable vector viewing control module configure to present a vector viewing control in conjunction with the presentation of the application window. In operation, the vector viewing control receives notice of computer user interaction with vector viewer control, the computer user interaction comprising an interaction point on the vector viewer control. After receiving notice of computer user interaction, the vector viewing control presents an expanded view of the vector viewing control proximate to the interaction point, the expanded view including the content of a cell of the data table.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein:

FIGS. 2A-2C are pictorial diagrams illustrating the exemplary application window of FIG. 1 displayed in conjunction with one or more vector viewing controls;

FIGS. 3A, 3B and 3C are pictorial diagrams illustrating the exemplary application window of FIG. 2A suitable for describing user interaction with the vector viewing control;

FIGS. 4A-4C are pictorial diagrams illustrating an exemplary application window showing a table of data and a corresponding vector viewing control configured to display the data of the table in an transformed manner;

DETAILED DESCRIPTION

For purposed of clarity, the use of the term "exemplary" in this document should be interpreted as serving as an illustration or example of something, and it should not be interpreted as an ideal and/or leading illustration of that thing. Further, the term "vector" should be understood as representing a series of cells along a particular data table dimension. For example, if a two-dimensional data table is comprised of 50 rows (Rows 1-50) and 10 columns (Columns A-J), one vector would be the cells of Column B (comprise each cell of Rows 1 through 50 that is located in Column B). Another example of a vector the data table example above is the cells of Row 5 (comprising each cell of Columns A through J that is also located in Row 5.) Three dimensional (as well as other, multi-dimensional) data tables may similarly benefit from vector viewing controls. Further, while generally discussed below as comprising a single row or column within a set of multiple rows or columns, a vector should not be viewed as limited to a single discrete "ray" of data along a dimension, but may comprise multiple rays along the same dimension or dimensions. The term "ray" should be viewed as a series of cells along a dimension. The examples above are examples of single ray vectors. In contrast, a vector of multiple rays would be the cells of Columns B and D, where each pair (or tuple) of cells in Columns B and D for a given row is viewed as a single element of the representative vector.

Figure 1:
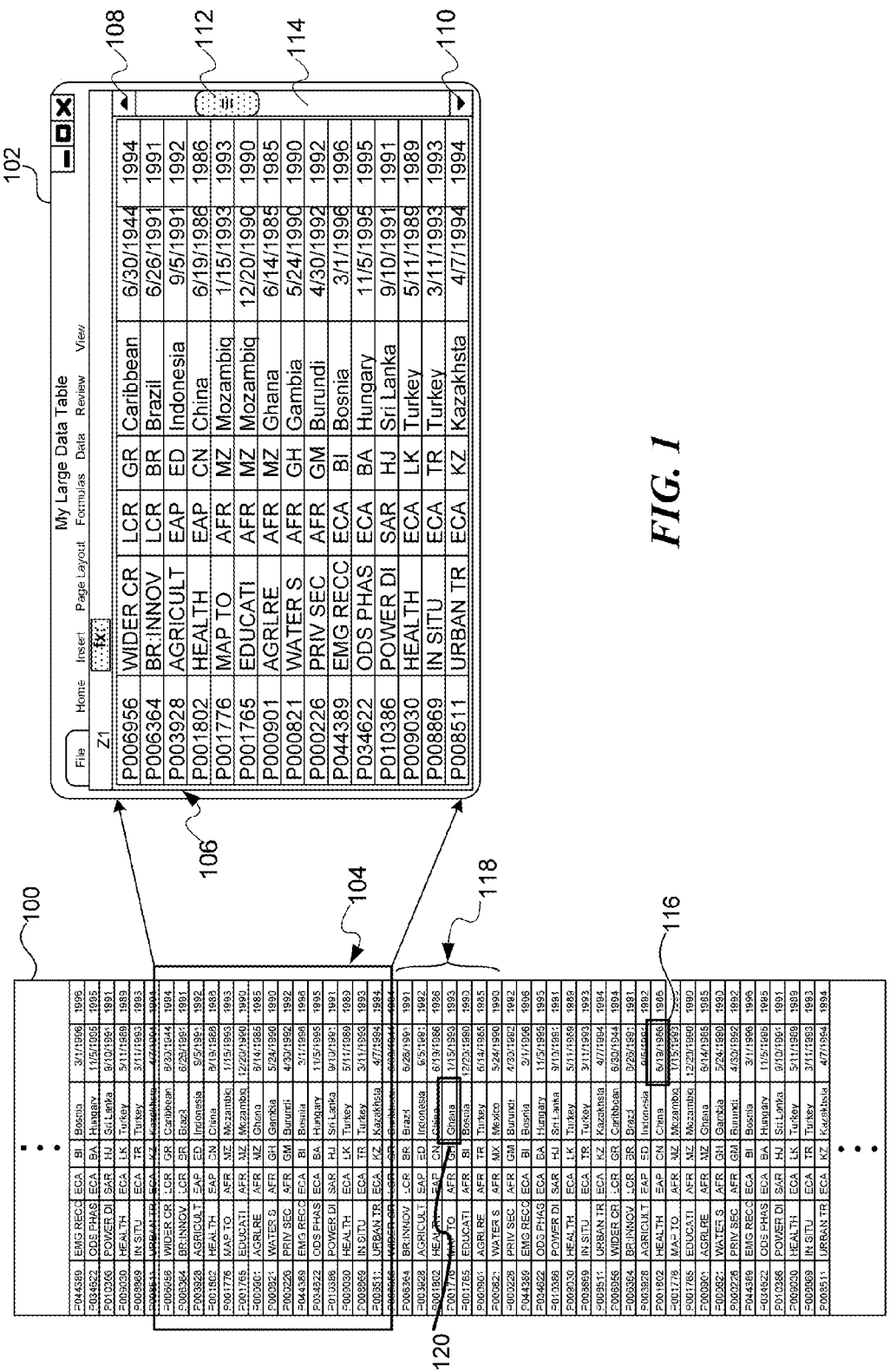
FIG. 1 is a pictorial diagram illustrating an exemplary table and a corresponding viewport displaying a portion of the table.

Turning to FIG. 1, FIG. 1 is a pictorial diagram illustrating a conceptual view of a portion of a data table 100 and a corresponding application window 102 displaying a portion 104 of the table in its viewport 106. As those skilled in the art will appreciate, due to display surface limitations, user preferences, and the like, the application window 102 can often only display a portion 104 of the larger data table 100. In order to view other portions of the data table 104, a computer user controls which portion of the data table 100 that is displayed via the viewport 106 using such controls as scrolling buttons 108-110, the slider button 112, clicking (via a cursor or by touch) within the slider view 114, arrow controls (not shown), a scrolling wheel on a mouse or other user interface device (not shown), page up and page down keys (not shown), as well as many other device specific user interfaces. The find feature of an application will also typically cause a different portion of the data table 100 to be displayed in the viewport 106. However, even using these various controls, singly or in combination, it is often difficult to scroll to and locate (visually) a specific cell in the data table 100, such as data cell 116, within the viewport 106.

To assist the computer user in viewing specific content (e.g., a data cell such as cell 116) of a data table presented to the computer user by an application having limited space for the application window 102 to display the table, a vector viewing control may be added to the application window. FIG. 2A is pictorial diagram illustrating the exemplary application window 102 of FIG. 1 displayed in conjunction with a vector viewing control 200. As will be described in greater detail below and in conjunction with additional figures, a vector viewing control provides a quick and easy way for a computer user to view and/or access data in a data table, irrespective of whether or not the data is currently displayed in a viewport 106.

The vector viewing control 200 includes a plurality of cell elements (such as cell elements 202-208) that represent one or more data cells (such as data cell 116) within the data table 100. The cell elements displayed in the vector viewing control 200 represent all of the data cells that are represented by the vector represented by the vector viewing control. While there may be a 1:1 correspondence between data cells (or a set of data cells) in the represented vector and cell elements in the vector viewing control 200, it is just as likely that this will not be the case. For any one vector represented by a vector viewing control 200, there may be more or fewer data cells than cell elements. Of course, the number of cell elements will likely be constrained according to available space to view the vector viewing control 200 in conjunction with the application window 102. Hence, in addition to a 1:1 (one to one) correspondence between data cells and cell elements in a vector viewing control, there may be a 1:many (one to many) correspondence or a many:1 (many to 1) correspondence depending on the size of the vector and the available viewing space.

The vector viewing control 200 also includes a vector selection control 210 that enables the computer user to select which vector (or vectors) along a table dimension is represented by the vector viewing control. The vector selection control 210 also optionally provides access to configuration information for the vector viewing control 200. These will be discussed in greater detail below.

While FIG. 2A displays the vector viewing control 200 as being independent of, and therefore displayed outside of, the application window 102, this represents one, non-limiting example of how it may be implemented and displayed in conjunction with an application window 102/viewport 106. In an alternative embodiment, such as shown in FIG. 2B, the vector viewing control 200 is displayed as part of the application window 102 in conjunction with the more traditional user interface controls for scrolling, such as slider button 210 and scrolling button 212. Moreover, in a further embodiment (not shown), the vector viewing control 200 may be embedded within the viewport 106, such as next to a column or row which is represented by the vector viewing control.

FIG. 2C represents yet another embodiment in which a vector viewing control 200 may be utilized in conjunction with an application window 102 (or a viewport 106.) As shown in FIG. 2C, the vector viewing control 200 is part of the application window 102 and, advantageously, represents the only vertical scrolling control for the application window. Markers, such as current location marker 214, may also be presented on the vector viewing control 200. Markers can be presented to indicate the location along the vector viewing control 200 of certain cells within the data table. These markers may correspond to, by way of illustration and not limitation, the current location (such as indicated by current location marker 214), locations that the computer user has marked for future reference, highly relevant data, and the like. Displaying the current location marker 214 may be particularly advantageous when the computer user is not currently interacting with the vector viewing control 200 in order to visually indicate the relative location of the content in the viewport 106 with respect to the entire data table.

Figures 3A, 3B:
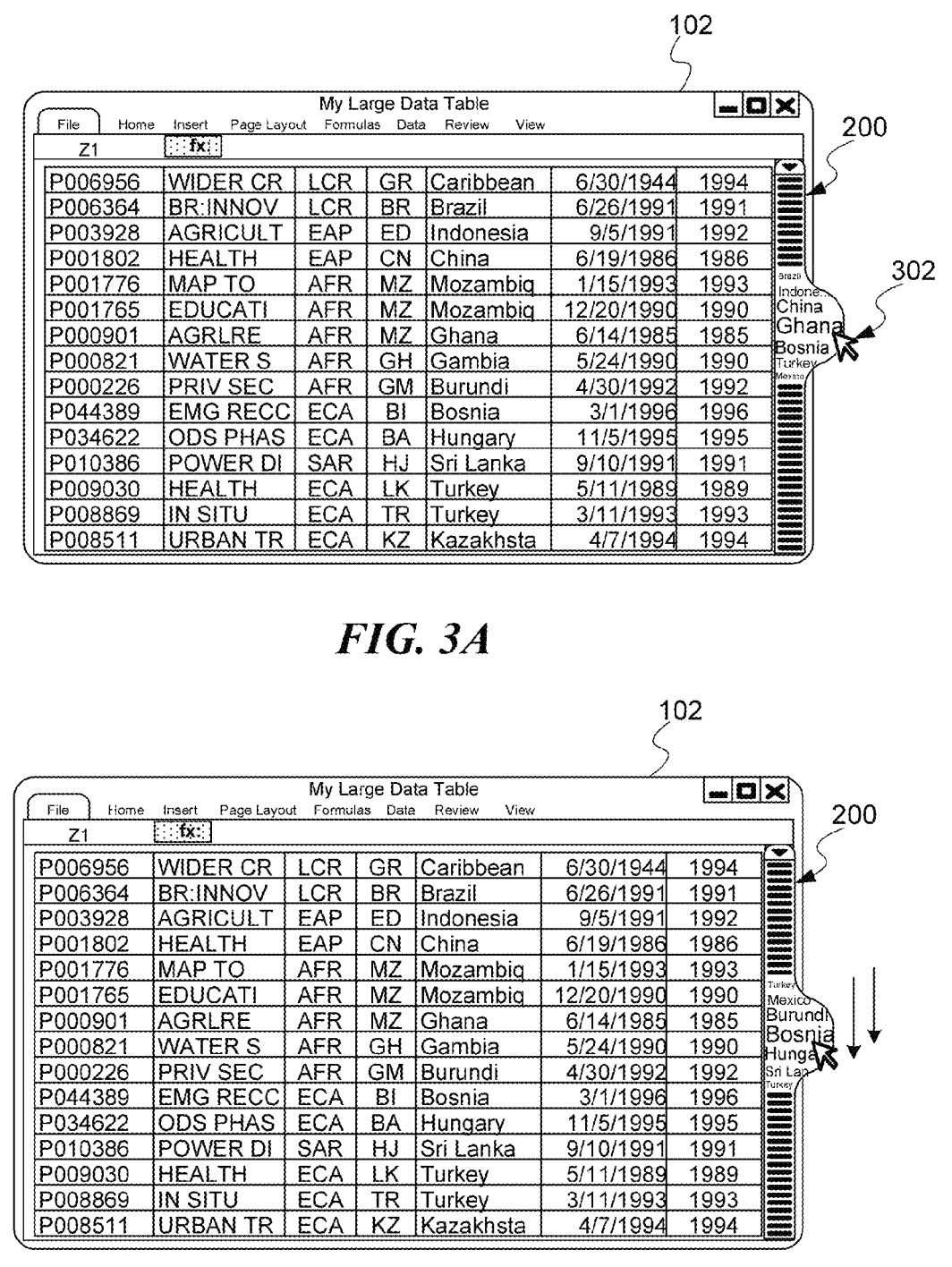
Figure 3C:
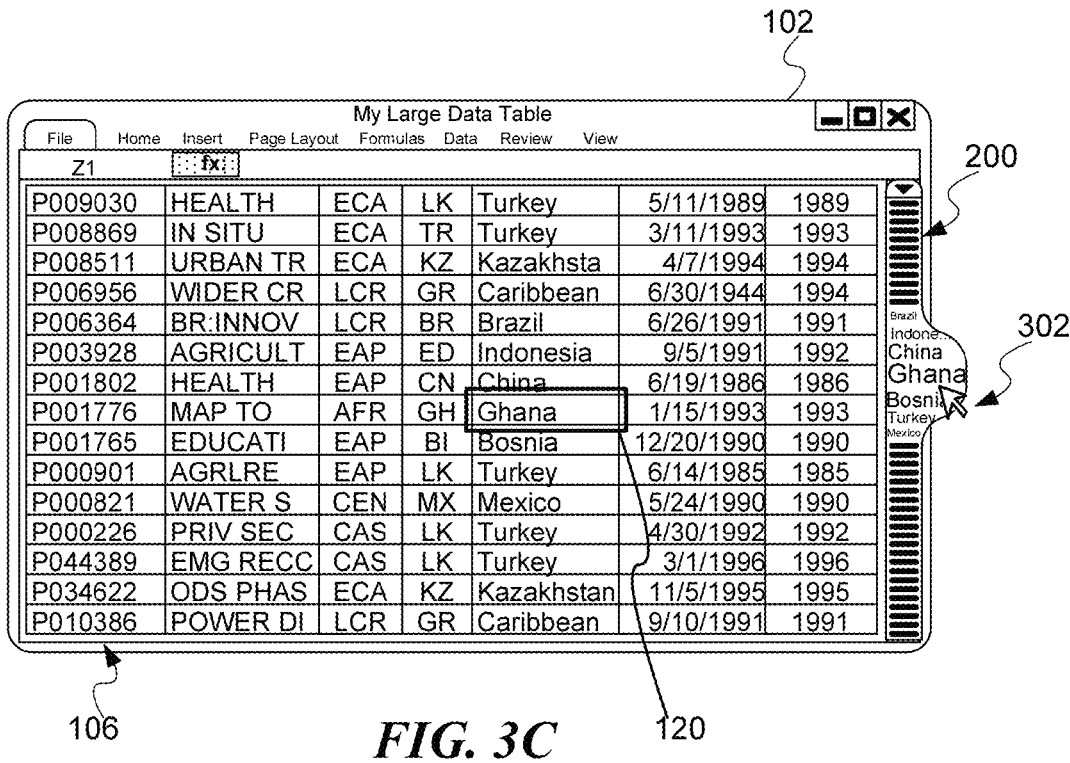

Of course, without user interaction the vector viewing control 200 simply takes up screen space. To illustrate the improved means (via the vector viewing control 200) for locating content within a data table 100, reference is now made to FIGS. 3A-3C. FIGS. 3A-3C are pictorial diagrams illustrating the exemplary application window 102 of FIG. 2C (with the vector viewing control 200) suitable for describing user interaction with a vector viewing control. According to aspects of the disclosed subject matter, as a computer user interacts with a vector viewing control 200, the area of the vector viewing control proximate to the interaction point is expanded and the content of the data cells corresponding to the expanded area is displayed. For example, assume that the vector represented by the vector viewing control 200 corresponds to the fifth column of that data table 100 of FIG. 1. As the user interacts with the vector viewing control 200, the control is expanded to reveal the content of the data cells (range 118 of FIG. 1) of the vector corresponding to the location of the user interaction with the control. In the present example, the location of user interaction with the vector viewing control 200 corresponds to cell 120 of data table 100 (FIG. 1), thus displaying the contents "Ghana." As an additional feature to make viewing content in a vector more easy to perform, the content of surrounding cells is also displayed, though in an increasing minimized manner the further away from the interaction point it is. Thus, the range of cells 118 is displayed to the computer user as a result of the user interacting with the vector viewing control 200.

Interaction with a vector viewing control 200 may be made in any number of manners. As shown in FIG. 3A, a pointer 302 (also referred to as a cursor) may be positioned over the vector viewing control 200 through any number of user interface devices including, but not limited to, a mouse, a "joystick", a touchpad, keyboard keys, and the like. Depending on implementation and configuration considerations, hovering a pointer over the vector viewing control 200 may be sufficient interaction to cause the control to expand (as described above) at the pointer/user interaction location. Alternatively, the vector viewing control 200 may need a selection (e.g., a mouse click) in order to activate the expansion of the vector viewing control as described above. However, the novel aspects of the vector viewing control should not be limited to the manner in which the user initiates user interaction. Further still, for touch sensitive devices (through the use of a pen, stylus, or the computer user's own touch), such as tablets, smart phones, touch sensitive monitors, and the like, interaction may be performed simply by touching an area of the cell elements in the vector viewing control 200.

According to additional aspects of the disclosed subject matter, once an area is expanded, as illustrated in FIG. 3A, a computer user may continue the interaction by moving the interaction point (either moving the pointer, touch, or stylus) along the vector viewing control 200 to view different cells. The area corresponding to the new interaction point is expanded while the area corresponding to the old interaction point (if sufficiently far enough away, is entirely collapsed back to the original vector cell elements. According to various aspects of the disclosed subject matter, moving back and forth along the vector viewing control 200 after user interaction works much like a magnifying glass, where the contents immediately at the interaction point are most expanded while the content further away is less magnified. This is also sometimes referred to as a fish-eye view.

FIG. 3B illustrates the results after the interaction point moved just slightly down the vector viewing control 200. The bottom entries in the expanded view for Turkey and Mexico from FIG. 3A are located at the top with Bosnia as the cell corresponding to the computer user's current interaction point. Continuous interaction continues until an event that signals the end of the user interaction is received. Of course, the actual event to end interaction will often depend upon the type of user interaction to initiate the expanded view. However, according to various aspects of the disclosed subject matter, these may include a mouse-up event, release or removal of a touch or pen, and the like.

In addition to simply being able to view the content of cells in a represented vector by way of the vector viewing control, other interactions to facilitate user access to data may be implemented. For example, with reference again to FIG. 3A, if the user were to provide a selection interaction (such as a double click, tap, right click, and the like) the vector viewing control 200 will cause the application displaying the data table 100 to display the content in its viewport 106 at the user's interaction point. FIG. 3C is a representative view of the application window 102 after the user provided a selection interaction on the vector viewing control 200. As can be seen, cell 120 (which corresponded to the user's interaction point when a selection interaction was provided) has been repositioned to be viewable in the viewport 106. In this example, the vector viewing control 200 is expanded since the pointer 302 is still located over the expanded area. Moreover, while the vector viewing control 200 in FIG. 3C is still displayed as being expanded, this is just one non-limited example. In an alternative configuration (not shown), the vector viewing control 200 may revert to its un-expanded state after causing the viewport 106 to display a selected cell, irrespective of the location of the pointer 302.

Figure 4A:
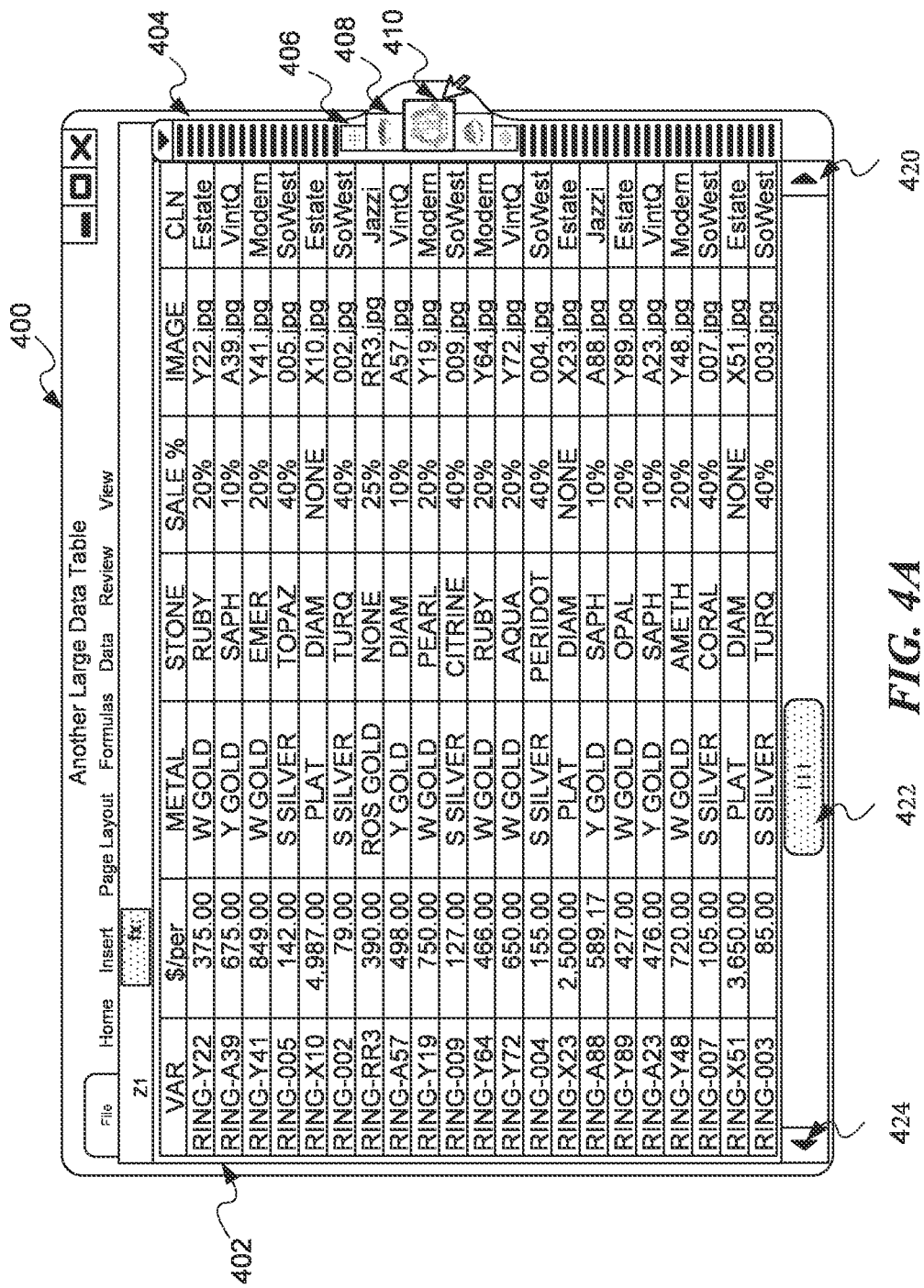

While the vector viewing control 200 may be implemented to display the contents of the cell as it, according to aspects of the disclose subject matter the vector viewing control may be configured to display the contents of the cells (in the expanded view) in an interpreted manner. For example, FIG. 4A is a pictorial diagram illustrating an exemplary application window 400 showing a table of data in its viewport 402 and a corresponding vector viewing control 404 configured to display the data of the table in a transformed/interpreted manner along a vertical axis. Also included in the application window 400 are conventional scrolling controls, such as scrolling buttons 420 and 424 as well as slider button 422. As indicated by this figure, according to various non-limiting embodiments of the disclosed subject matter, a vector viewing control 404 may be implemented along one axis while more conventional scrolling controls may be implemented along an orthogonal axis.

For this example, the vector viewing control 404 represents the vector corresponding to the "IMAGE" column where each cell includes an image file name. Moreover, in this example the vector viewing control is expanded (indicating computer user interaction). However, instead of listing the textual contents of the cells in the represented vector, the vector viewing control 404 intelligently interprets and displays the corresponding image (such as images 406-410). Indeed, according to aspects of the disclosed subject matter, the vector viewing control 400 may be configured to interpret the contents of a represented vector and display corresponding results. These may include, but are not limited to: thumbnails of hyperlinked content; images; information cards, and the like. Indeed, one (of many) aspect of novelty lies in being the vector viewing control 400 configured to display corresponding information in the expanded portion of the control, not in the particular interpretation.

Figure 5:
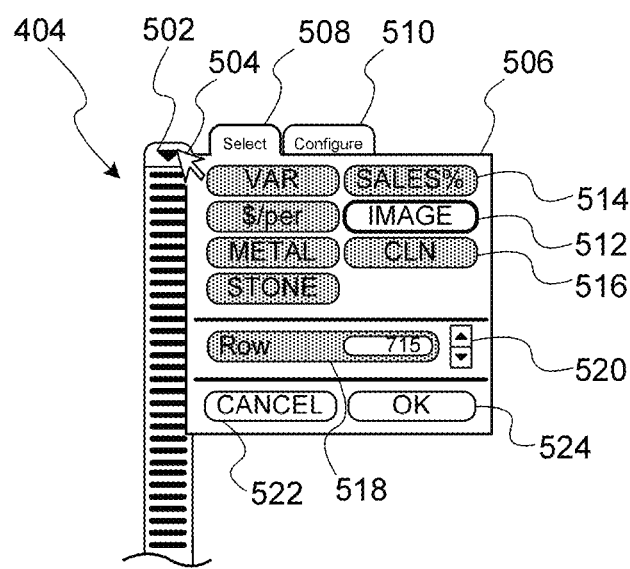
FIG. 5 is a pictorial diagram illustrating an exemplary vector viewing control presenting a selection window through which a computer user can select one or more rays to be the representative vector for the control.

As mentioned above, a user may identify one or more rays along a particular dimension to be the representative vector for a vector viewing control (such as vector viewing control 402). FIG. 5 is a pictorial diagram illustrating a selection window 506 through which a computer user can select which rays are to be used as the representative vector for the vector viewing control 404. According to one, non-limiting embodiment, the user access the selection window 506 through activation of the vector selection control 502 which, for this example, presents a pop-up, tabbed, selection window 506 through which the user can select the dimension as well as the rays that comprise the vector. Activation may be made through a selection by a pointing device (as represented by cursor 504), through a touch gesture (not shown), selection by a stylus (not shown), a voice command, a key-press, or any number of suitable user interaction mechanisms.

In this non-limiting example, the selection window 506 includes a select tab 508 as well as a configure tab 510. Through the select tab 508, the computer user is able to select which rays (rows, columns, or other dimensions) will be used to form the vector that is represented by the vector viewing control 404. As shown in this example, column button 512 is selected, corresponding to the IMAGE column of the data table shown by the application window 400 in FIG. 4. Other columns are unselected as evidenced by their unselected state (e.g., column buttons 514-516.) For purposes of the present example, each button (including buttons 512-518) is a binary toggle button.

While buttons in different dimensions, such as column button 512 vs. row button 518, may be mutually exclusive, since any one vector viewing control (such as vector viewing control 404) represents a vector in a single dimension, multiple buttons for rays within the same dimension (such as column buttons 512-516) may be selected. When multiple rays are selected for a vector, the tuple of cells for each ray represent a single value within the representative vector of the vector viewing control. For example, if control buttons 512 and 514 were selected, each cell in the vector represented by vector viewing control 404 would comprise the content of the "Sales %" cell and the "IMAGE" cell.

According to aspects of the disclosed subject matter, if the computer user selects one or more rays in a dimension that is not currently represented by the vector viewing control, upon acceptance (such as by pressing the OK button 524) the vector viewing control is aligned with the new dimension. For example, assuming that the computer user were to select "Row" button 518, the vector viewing control 404 may be repositioned next to the application window 400 at the bottom and along the direction of rows in the data table, as illustrated in FIG. 4B. A current location marker 414 provides a visual cue as to the location of the content displayed in the viewport of the application window 400 along a horizontal axis.

Figure 4C:
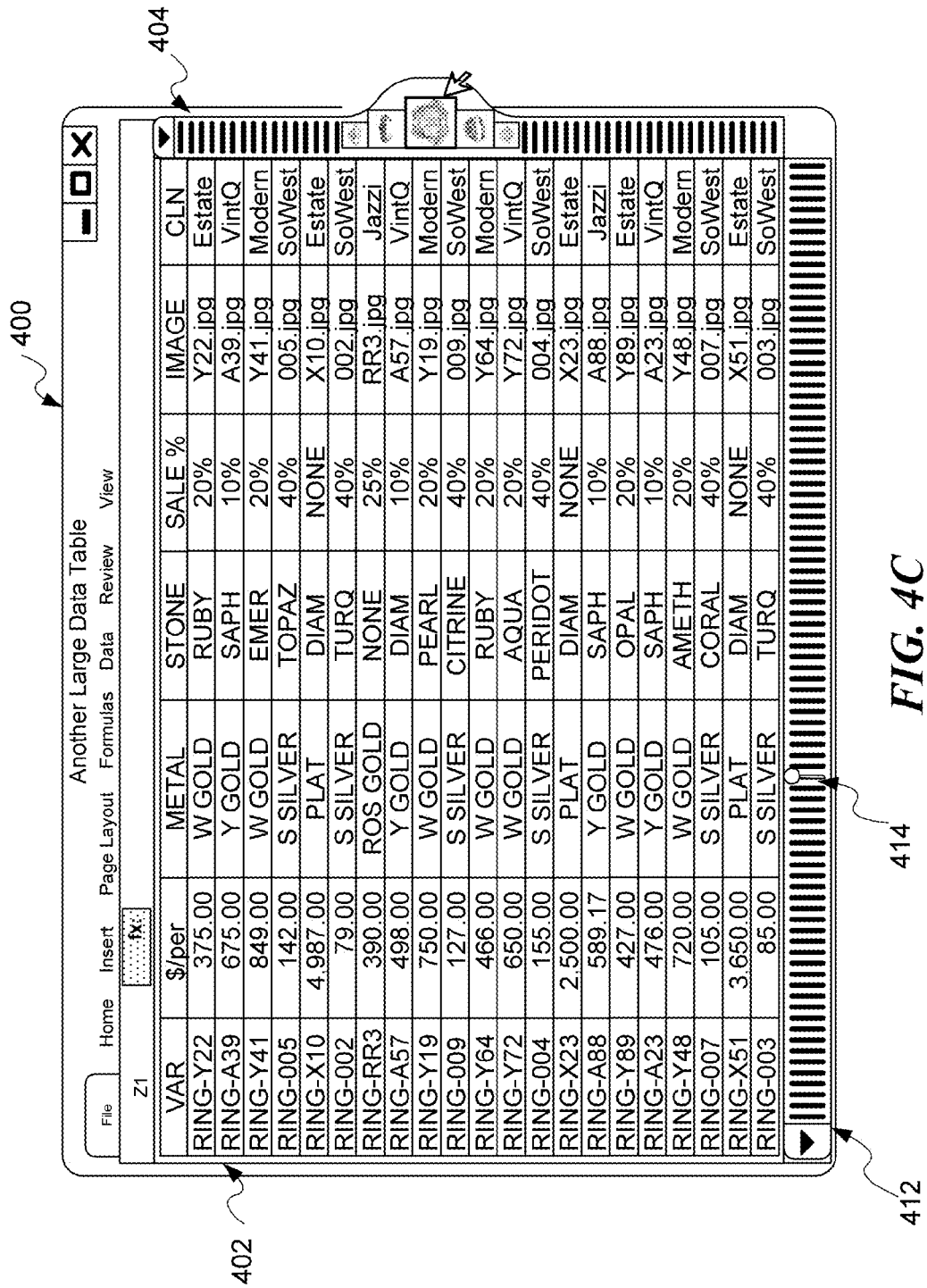

It should be appreciated, however, that an application window is not limited to displaying a single vector viewing control. FIG. 4C illustrates the application window 400 having two vector view controls 404 and 412. Since the vector viewing control 404 is expanded, in this example the expansion is sufficient to indicate the vertical position of the viewport 402 in the data table. On the other hand, since vector viewing control 412 is not expanded, a current location marker 414 is presented to indicate the current horizontal location of the viewport 402 with respect to the underlying data table.

With reference again to FIG. 5, when vector viewing controls are displayed along multiple axes, such as illustrated in FIG. 4C, the selection of buttons in orthogonal axes may not necessarily be mutually exclusive. Rather, such selections may simply indicate a configuration of vectors along multiple axes.

Figure 6:
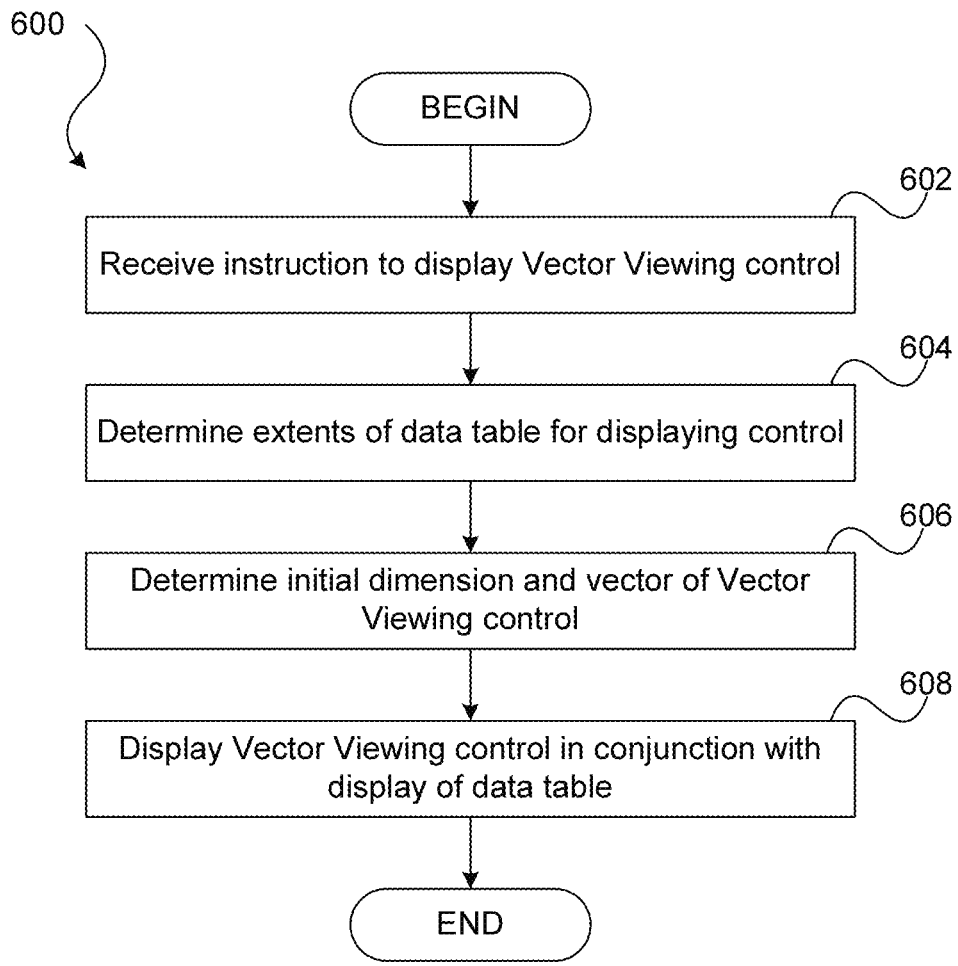
FIG. 6 is a flow diagram illustrating an exemplary routine for presenting a vector viewing control in conjunction with an application window displaying a data table.

FIG. 6 is a flow diagram illustrating an exemplary routine 600 for presenting a vector viewing control, such as vector viewing control 200 of FIG. 2A, in conjunction with an application window displaying a data table. Proceeding to block 602, an instruction is received to display a vector viewing control 200 in conjunction with an application window (such as application window 102) displaying a data table. The instruction to display the vector viewing control 200 may be automatically made as part of the code/instructions to display the data table in the application window 102, may be made at the direction of a computer user in order to better view content in the data table. Moreover, while the vector viewing control 102 is displayed as a control external to the application window 102, in an alternative embodiment the vector viewing control may be displayed as included in the application window (such as shown in FIG. 1B), with or without other scrolling controls. Also included in the instruction to display a vector viewing control 200 is an indication as to the axis along with the control will be displayed and represent.

At block 604, a determination is made as to the extents of the data table. The vector viewing control 200 uses the extents (the number of cells of each dimension) in order to be able to translate the interaction point to one or more cells when a computer user interacts with the vector viewing control. Of course, the extents may be provided to the vector viewing control 200 as part of the initialization of the control, or may query the application or gain access to the data table to determine the extents. In addition having the relationship to correlate a computer user's interaction point with a cell, the vector viewing control may further use the extents to determine whether each element displayed in the control (such as cell elements 202-208 of FIG. 2A) correspond to a single cell or multiple cells. Of course, in some embodiments a computer user may configure the vector viewing control 200 to control the granularity of the cell elements (i.e., whether a cell element corresponds to a single cell in the vector, or whether the cell element corresponds to multiple cells or tuple.)

At block 606, the initial dimension and vector of the vector viewing control 200 are determined. These determinations may be made according to any number of factors, including (but not limited to) parameters supplied to vector viewing control 200 from an external source, predetermined configuration information, or determining the largest dimension and/or the most likely data that the computer user would view. For example, for a given data table (such as data table 100 of FIG. 1), external parameters supplied to the vector viewing control may direct the vector viewing control to select "columns" as the initial dimension and fifth column as the vector's only ray (such as shown in FIGS. 3A and 3B.) Thereafter, at block 608, the vector viewing control is displayed in conjunction with the display of the data table. As already mentioned, the vector viewing control 200 may be displayed as a control associated with the application window displaying the data table (such as is illustrated in FIG. 2A) or as included in the application window (such as illustrated in FIG. 2B.) Moreover, the vector viewing control will generally be aligned (if possible) with the orientation of the dimension for which the vector represented by the control is oriented. Thereafter, the routine 600 terminates.

Figure 7:
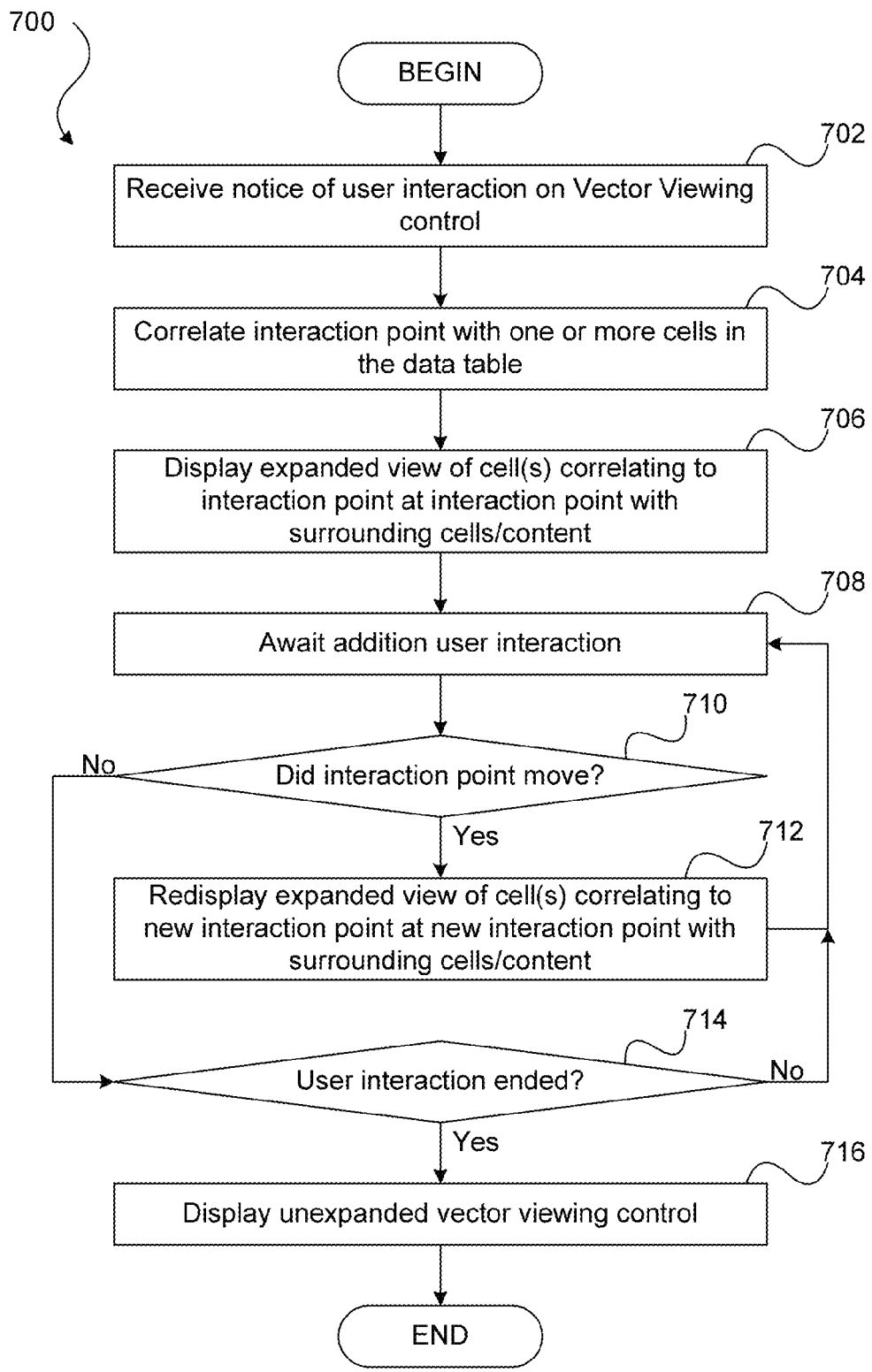
FIG. 7 is a flow diagram illustrating an exemplary routine for interacting with a vector viewing control for viewing the contents of a data table.

While FIG. 6 is directed to initially displaying the vector viewing control 200, FIG. 7 is a flow diagram illustrating an exemplary routine 700 for interacting with a vector viewing control 200 for viewing the contents of a data table 100. Beginning at block 702, an indication or notice of a computer user's interaction is received (by the underlying code supporting display of the vector viewing control 200). In particular, this computer user interaction is in regard to displaying an expanded view of the data in the data table by way of the vector viewing control 200. At block 704, a correlation is made between the computer user's interaction point and content in the data table 100, particularly one or more data cells in the data table. At block 706, an expanded view of the cell (or cells if there are multiple rays in the representative vector) correlating to the computer user's interaction point is display at the computer user's interaction point. As suggested above, according to aspects of the disclosed subject matter, in addition to data from the cell or cells specifically correlated to the computer user's interaction point, data from cells proximately surrounding the computer specific correlated cell (or cells) are also display but in diminished size such as one might see with a magnifying glass or "fish-eye" view. While the number of surrounding cells that is displayed in the expanded views of FIGS. 3A and 3B is three to either side of the selected cell, this is illustrative only and should not be viewed as limiting upon the disclosed subject matter. As shown in FIG. 4A, the number (or rather reach) of surrounding cells is two, but this again is illustrative. A determination as to how many cells on either side of the cell at the interaction point may be made according to designer preferences, user preferences, the amount of space available for the expanded view, the display size of each cell(s) being displayed, and the like.

After displaying the expanded view, at block 708 the routine 700 awaits additional user interaction. After receiving such interaction, at decision block 710 a determination is made as to whether the interaction corresponds to whether the computer user's interaction point has moved, thus supporting the ability of the computer user to move up and down the vector to easily view content represented by the vector. If, at decision block 710, it is determined that the computer user's interaction point has move, at block 712 the expanded view is redisplayed at the new interaction point with a cell or cells correlating to the new interaction point displayed in main. Also included in the redisplayed expanded view are surrounding cells of the cell/cells correlating to the new interaction point. As above, according to aspects of the disclosed subject matter, the surrounding cells are displayed in a diminished fashion according to the distance from the cell/cells correlating to the new (or current) computer user interaction point.

After having redisplayed the expanded view of cells correlating to the new computer user interaction point, the routine 700 returns to block 708 where further user interaction is awaited. After receiving additional interaction and determining that the interaction is not a movement of the computer user's interaction point (determined to be so at decision block 710), at decision block 714 a determination is made as to whether the interaction was to end the display of the expanded view (such as may occur when the computer releases a mouse click or ceases touching a touch-sensitive surface.) If not, the routine 700 returns to block 708 to await additional user interaction (though the vector viewing control 200 may be configured to complete other functions not listed in this routine 700). However, if the interaction is to end the display of the expanded view, at block 716 the vector viewing control is displayed again in its unexpanded form (e.g., see vector viewing control 200 of FIGS. 2A and 2B), and the routine terminates. As indicated above, in an unexpanded form, a vector viewing control may include a current location marker (such as current location marker 414) to indicate the current location of the viewport with respect to the data table for the axis that the vector viewing control represents.

Figure 8:
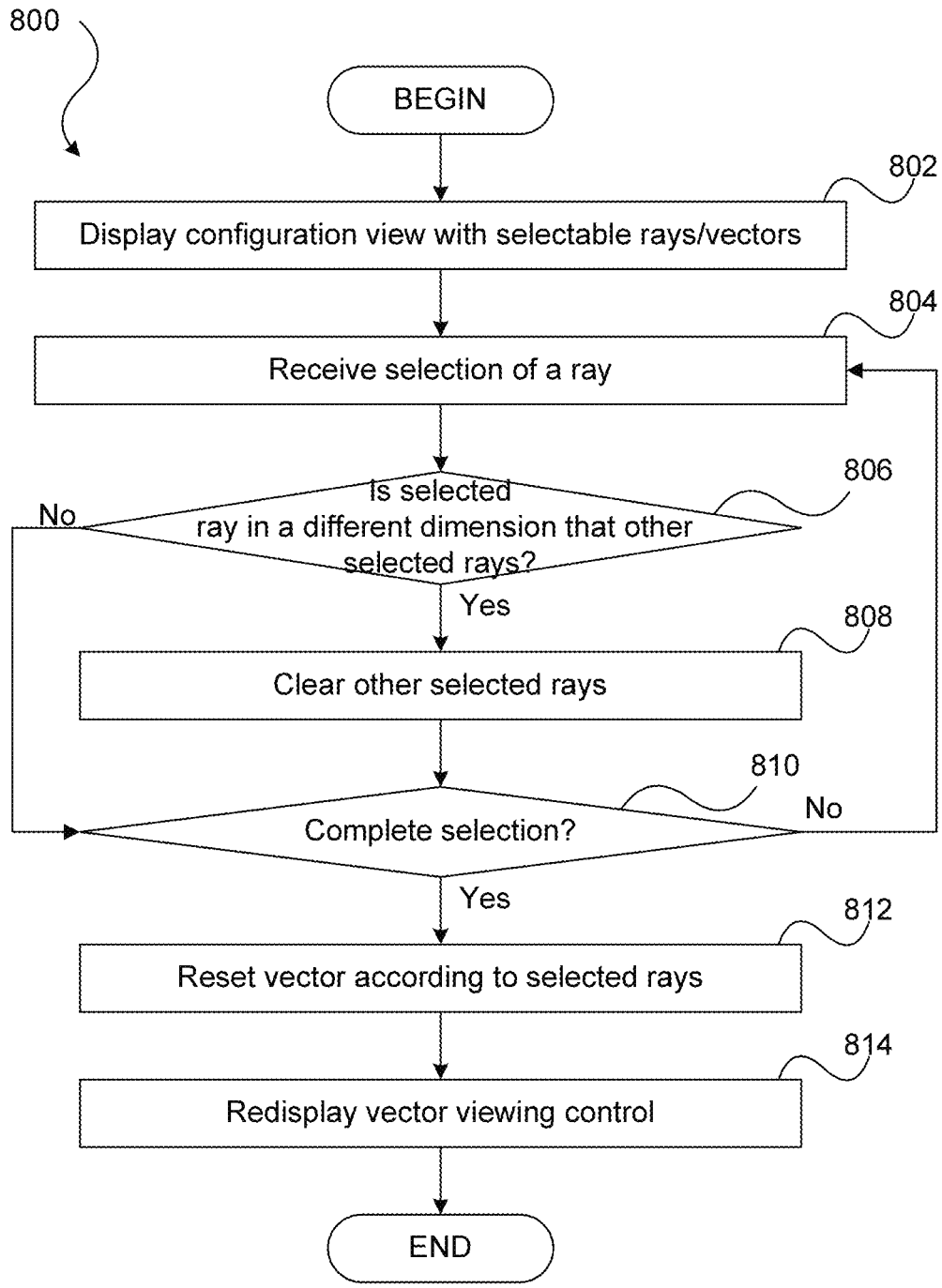
FIG. 8 is a flow diagram illustrating an exemplary routine for configuring the representative vector of the vector viewing control.

As mentioned in regard to FIG. 5, the representative vector of a vector viewing control, such as vector viewing control 402 of FIG. 5, can be configured by the computer user. For example, the vector viewing control 402 of FIG. 5 is configured such that the "IMAGE" column is the only ray currently represented in vector represented by the control. However, other rays in the column dimension may be selected or rays in another dimension may be selected. To that end, FIG. 8 is a flow diagram illustrating an exemplary routine 800 for configuring a representative vector of a vector viewing control according to computer user preferences.

Beginning at block 802, a selection window 506 is presented with the selectable rays/vectors from which a user may choose in order to configure the vector of the vector viewing control 402. As discussed above, the selectable rays/vectors corresponding to the various columns, rows, or elements of other dimensions of a data table 100. With reference to the selection window 506 of FIG. 5, rays/vectors may be selected in two dimensions, rows and columns. In addition to displaying the selectable rays/vectors, according to aspects of the disclosed subject matter, those rays that currently comprise the representative vector of the vector viewing control 402 are displayed in a selected manner. For example, the "IMAGE" column button 512 of selection window 506 is selected indicating that this is the single ray currently comprising the vector represented by the vector viewing control 402.

At block 804, a selection of a ray is received. As previously indicated a vector may be comprised of multiple rays along a single dimension. Thus, in addition to the "IMAGE" column button 512 that is currently selected, the computer user may select other rays in that dimension, such as "SALES %" via the "SALES %" button 514 or "CLN" via the "CLN" button 516. Also, a computer user may choose to select a ray in another dimension. For example, the computer user may use button 518 to select the ray "Row 715". Of course, according to one embodiment, by selecting a ray in a dimension other than the dimension that is currently selected, the other previously selected rays will be unselected. Thus, at decision block 806, a determination is made as to whether a newly selected ray is in a different dimension then other selected rays. If yes, at block 808, the other selected rays (other than the newly selected ray) are cleared.

At block 810, a determination is made as to whether the computer user has completed selection of the raised to be represented by the vector in the vector viewing control 402. If not, the routine 800 returns again to block 804 to obtain additional selections from the computer user. Otherwise, at block 812, the representative vector of the vector viewing control is reset according to the now selected rays. At block 814, the vector viewing control 402 is redisplayed based on the newly selected/configured vector.

Regarding the routines of FIGS. 6-8, it should be appreciated that while they are expressed with discrete steps, these steps should be viewed as being logical in nature and may or may not correspond to any actual, discrete steps. Moreover, while these routines are set forth in a particular order in carrying out various functionality, the order that these steps are presented should not be construed as the only order in which the various steps may be carried out in their respective routines. Further, those skilled in the art will appreciate that logical steps may be combined together or be comprised of multiple steps.

Still further, while novel aspects of the disclosed subject matter are expressed in routines or methods, this functionality may also be embodied on computer-readable media. As those skilled in the art will appreciate, computer-readable media can host computer-executable instructions for later retrieval and execution. When executed on a computing device, the computer-executable instructions carry out various steps or methods. Examples of computer-readable media include, but are not limited to: optical storage media such as digital video discs (DVDs) and compact discs (CDs); magnetic storage media including hard disk drives, floppy disks, magnetic tape, and the like; memory storage devices such as random access memory (RAM), read-only memory (ROM), memory cards, thumb drives, and the like; cloud storage (i.e., an online storage service); and the like. For purposes of this document, however, computer-readable media expressly excludes carrier waves and propagated signals.

Figure 9:
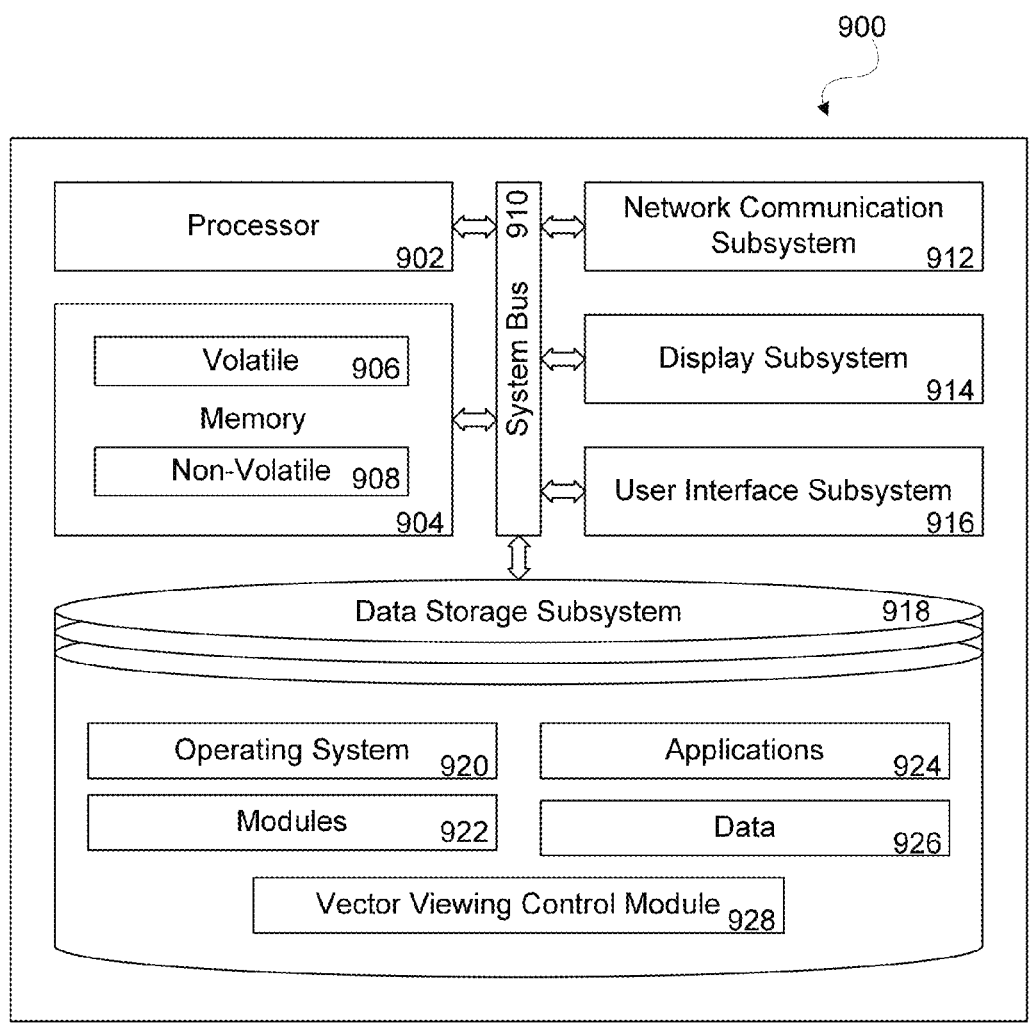
FIG. 9 is a block diagram illustrating an exemplary computer system configured to present a vector viewing control in conjunction with an application window displaying a data table.

Referring now to FIG. 9, FIG. 9 is a block diagram illustrating an exemplary computer system 900 configured to present to a computer user a vector viewing control 200 in conjunction with an application window 102 displaying a data table 100. In particular, in order to provide additional context for aspects of the disclosed subject matter, FIG. 9 and the following description are intended to provide a brief, general description of a suitable computing system 900 in which the various aspects can be implemented.

The computing system 900 includes a processor (or processing unit) 902 and a memory 904 interconnected by way of a system bus 910. As those skilled in the art will appreciate, the processor executes instructions retrieved from the memory 904 in carrying out various functions and, particularly, presenting a vector viewing control 200 in conjunction with the display of an application window 102 showing a data table 100. The processor may be comprised of any of various commercially available processors such as single-processor, multi-processor, single-core units, and multi-core units. Moreover, those skilled in the art will appreciate that the novel aspects of the disclosed subject matter may be practiced with other computer system configurations, including but not limited to: mini-computers; mainframe computers, personal computers (e.g., desktop computers, laptop computers, tablet computers, etc.); handheld computing devices such as smartphones, personal digital assistants, and the like; microprocessor-based or programmable consumer electronics; and the like.

The memory 904 may be comprised of both volatile memory 906 (e.g., random access memory or RAM) and non-volatile memory 908 (e.g., ROM, EPROM, EEPROM, etc.) Moreover, the memory 904 may obtain data and/or executable instructions (especially within the volatile memory 906) from the data storage subsystem 918 by way of the system bus 910. Moreover, a basic input/output system (BIOS) can be stored in the non-volatile memory 908 and conclude the basic routines that facilitate the communication of data and signals between complements within the computing system 900, such as during startup of the computing system. The volatile memory 906 may also include a high-speed RAM such as static RAM for caching data.

The system bus 910 provides an interface for system component's to enter communicate. The system bus 910 can be of any of several types of bus structures that can interconnect the various components (both internal and external components). The computer system 900 further includes a network communication subsystem 912 for interconnecting with other computers and devices on a computer network. The network communication subsystem 912 may be configured to communicate with an external network via a wired connection, a wireless connection, or both.

Also included in the computer system 900 is a display subsystem 914. It is through the display subsystem 914 that the computer system presents a vector viewing control 200 to the computer user in conjunction with the display of an application window 102 displaying a data table 100. Further still, the computer system 900 includes a user interface subsystem 916 through which the computer system obtains user input. The user interface subsystem 916 provides the interface with various user interface mechanisms including, but not limited to: voice input/output; visual recognition systems; keyboards; touchpads; touch- or gesture-based enabled surfaces (including display surfaces); pointing devices; and the like. Indeed, while the display subsystem 914 has been individually called out as part of the computer system 900, those skilled in the art will appreciate that in many configurations the display subsystem 914 is part of the user interface subsystem 916.

The data storage subsystem 918 provides an additional storage system in addition to the memory 904. Within the data storage subsystem 918 can be found the operating system 920 for the computer system 900, applications 924 (which may include one or more applications that are configured to display an application window 102 showing a data table 100); executable modules 922; as well as data 926 which may include a data table 100. Still further part of the data storage subsystem 918 is a vector viewing control module 928 that includes the instructions and configurations necessary to present a vector viewing control 200 in conjunction with an application window 102 displaying a data table 100. Indeed, the vector viewing control module includes, but is not limited to, the instructions necessary to implement the functionality outlined in regard to routines 600, 700, and 800 described above.

It should be appreciated, of course, that many of the components and/or subsystems described as being part of the computer system 900 should be viewed as logical components for carrying out various functions of a suitably configured computer system. As those skilled in the art appreciate, logical components (or subsystems) may or may not correspond directly in a 1:1 manner to actual components. Moreover, in an actual embodiment, these components may be combined together or broke up across multiple actual components.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer implemented method for facilitating access to data in a data table, the method comprising:

selecting a vector of cells in a data table to be represented in a plurality of cell elements of a vector viewing control that is operable to navigate the data table, with the vector being one of multiple available vectors of the data table that can be selected to be represented in the cell elements of the vector viewing control, and with the selected vector being a series of cells of the data table along a data table dimension;

presenting the vector viewing control in conjunction with a presentation of a viewport in an application window displaying the data table on an output device, wherein the vector viewing control comprises the plurality of cell elements, each cell element corresponding to one or more cells in the data table, and wherein the plurality of cell elements corresponds to the selected vector of cells in the data table that is represented by the vector viewing control, and wherein the vector viewing control is separate from the displayed data table;

receiving notice of computer user interaction with the vector viewing control, the computer user interaction comprising an interaction point on a selected cell element of the vector viewing control;

identifying a cell of the data table in the selected vector according to a location of the interaction point relative to the vector viewing control, with the identifying of the cell using results of the selecting of the vector of cells; and presenting an expanded view of a portion of the vector viewing control proximate to the interaction point in response the notice of computer user interaction, with the expanded view of the portion being expanded relative to one or more other portions of the vector viewing control, and with the expanded view of the portion including a view of the selected cell element that comprises a representation of content of the identified cell of the data table, and with the presenting of the expanded view being performed at the same time as displaying the identified cell of the data table.

2. The computer implemented method of claim 1, wherein the selected vector represented by the vector viewing control comprises a plurality of rays along a dimension of the vector, and wherein presenting the expanded view of the portion of the vector viewing control proximate to the interaction point comprises including representation of content from a tuple of cells of the data table, with the tuple of cells comprising a cell from each of the plurality of rays.

3. A computer system comprising:
at least one processor;
memory bearing computer-executable instructions that, when executed by at least one processor, cause at least one processor to perform acts comprising:
selecting a vector of cells in a data table to be represented in a plurality of cell elements of a vector viewing control that is operable to navigate the data table, with the vector being one of multiple available vectors of the data table that can be selected to be represented in the cell elements of the vector viewing control, and with the selected vector being a series of cells of the data table along a data table dimension;
presenting the vector viewing control in conjunction with a presentation of a viewport in an application window displaying the data table on an output device, wherein the vector viewing control comprises the plurality of cell elements, each cell element corresponding to one or more cells in the data table, and wherein the plurality of cell elements corresponds to the selected vector of cells in the data table that is represented by the vector viewing control, and wherein the vector viewing control is separate from the displayed data table;
receiving notice of computer user interaction with the vector viewing control, the computer user interaction comprising an interaction point on a selected cell element of the vector viewing control;
identifying a cell of the data table in the selected vector according to a location of the interaction point relative to the vector viewing control, with the identifying of the cell using results of the selecting of the vector of cells; and
presenting an expanded view of a portion of the vector viewing control proximate to the interaction point in response the notice of computer user interaction, with the expanded view of the portion being expanded relative to one or more other portions of the vector viewing control, and with the expanded view of the portion including a view of the selected cell element that comprises a representation of content of the identified cell of the data table, and with the presenting of the expanded view being performed at the same time as displaying the identified cell of the data table.

4. The computer system of claim 3, wherein the view of the selected cell element of the vector viewing control comprises an interpreted form of content of the identified cell of the data table, with the interpreted form of content being different from an original form of content that is displayed in the identified cell of the data table at the same time as the presenting of the expanded view.

5. The computer system of claim 4, wherein the presenting of the expanded view of the portion of the vector viewing control proximate to the interaction point further comprises showing the selected cell element in a highlighted manner with respect to one or more cell elements on either side of the selected cell element.

6. The computer system of claim 5, wherein the showing of the selected cell element in a highlighted manner with respect to one or more cell elements on either side of the selected cell element along the vector comprises showing one or more cell elements on either side of the selected cell element in a reduced size relative to the selected cell element.

7. The computer system of claim 6, wherein acts comprise displaying the one or more cell elements on either side of the selected cell element along the vector viewing control in an increasing reduced size according to their distance from the selected cell element.

8. The computer system of claim 4, wherein the interpreted form of content from the identified cell comprises a graphical image of content referenced by text in the identified cell.

9. The computer system of claim 3, wherein the selected vector represented by the vector viewing control comprises a plurality of rays along a dimension of the vector, and wherein presenting the expanded view of the portion of the vector viewing control proximate to the interaction point comprises including representations of content from a tuple of cells of the data table, with the tuple of cells comprising a cell from each of the plurality of rays.

10. A computer system comprising:
at least one processor;
memory bearing computer-executable instructions that, when executed by at least one processor, cause at least one processor to perform acts comprising:
selecting a vector of cells in a data table to be represented in a plurality of cell elements of a vector viewing control that is operable to navigate the data table, with the vector being one of multiple available vectors of the data table that can be selected to be represented in the cell elements of the vector viewing control, and with the selected vector being a series of cells of the data table along a data table dimension;
presenting the vector viewing control in conjunction with a presentation of a viewport in an application window displaying the data table on an output device, wherein the vector viewing control comprises the plurality of cell elements, each cell element corresponding to one or more cells in the data table, and wherein the plurality of cell elements correspond to the selected vector of cells in the data table that is represented by the vector viewing control, and wherein the vector viewing control is separate from the displayed data table, with the vector of cells to which the cell elements correspond comprising one or more cells at least partially within the viewport and one or more cells outside the viewport;
receiving notice of computer user interaction with the vector viewing control, the computer user interaction comprising an interaction point on a selected cell element of the vector viewing control;
identifying a cell of the data table in the selected vector according to a location of the interaction point relative to the vector viewing control, with the identifying of the cell using results of the selecting of the vector of cells; and
presenting an expanded view of a portion of the vector viewing control proximate to the interaction point in response the notice of computer user interaction, with the expanded view of the portion being expanded relative to one or more other portions of the vector viewing control, and with the expanded view of the portion including a view of the selected cell element that comprises a representation of content of the identified cell of the data table, and with the presenting of the expanded view being performed at the same time as displaying the identified cell of the data table.

11. The computer system of claim 10, wherein the acts comprise a view of an interpreted form of content from the identified cell being presented in the expanded view of the vector viewing control at the same time as a view of the content of the identified cell is presented in the viewport separately from the view of the interpreted form of content, and with the interpreted form of content being different from the content of the identified cell.

12. The computer system of claim 11, wherein the computer user interaction with the vector viewing control is a first computer user interaction with the vector viewing control, wherein the interaction point is a first interaction point, wherein the selected cell element is a first cell element, wherein the identified cell of the data table is a first cell of the data table, wherein the expanded view of the vector viewing control is a first expanded view, and wherein the acts further comprise:

receiving notice of a second computer user interaction with the vector viewing control, the second computer user interaction comprising a second interaction point on a second cell element of the vector viewing control; and presenting a second expanded view of the vector viewing control proximate to the second interaction point, the second expanded view including a cell element comprising content representing a second cell of the data table while the second cell of the data table is located outside of the viewport.

13. The computer system of claim 10, wherein the selection of the vector is performed in response to user input identifying the selected vector from the multiple available vectors of the data table.

14. The method of claim 1, wherein the vector of cells to which the cell elements correspond comprises one or more cells at least partially within the viewport and one or more cells outside the viewport.

15. The computer system of claim 3, wherein the selected vector is a set of one or more rows of the data table.

16. The computer system of claim 3, wherein the selected vector is a set of one or more columns of the data table.

17. The computer system of claim 3, wherein the selection of the vector is performed in response to user input identifying the selected vector from the multiple available vectors of the data table.

18. The computer system of claim 3, wherein cell elements of the vector viewing control are arranged in a column.

19. The computer system of claim 3, wherein cell elements of the vector viewing control are arranged in a row.

20. The computer implemented method of claim 1, wherein the selection of the vector is performed in response to user input identifying the selected vector from the multiple available vectors of the data table.

* * * * *